US012601668B2

(12) United States Patent
Weinhold

(10) Patent No.: US 12,601,668 B2
(45) Date of Patent: Apr. 14, 2026

(54) TESTING DEVICE AND METHOD FOR TESTING A SURFACE OF A TEST OBJECT

(71) Applicant: Innowep GmbH, Würzburg (DE)

(72) Inventor: Wolfgang P. Weinhold, Würzburg (DE)

(73) Assignee: Innowep GmbH, Würzburg (DE)

( * ) Notice: Subject to any disclaimer, the term of this patent is extended or adjusted under 35 U.S.C. 154(b) by 188 days.

(21) Appl. No.: 18/546,042

(22) PCT Filed: Feb. 3, 2022

(86) PCT No.: PCT/DE2022/100095
§ 371 (c)(1),
(2) Date: Aug. 10, 2023

(87) PCT Pub. No.: WO2022/171248
PCT Pub. Date: Aug. 18, 2022

(65) Prior Publication Data
US 2024/0125683 A1      Apr. 18, 2024

(30) Foreign Application Priority Data

Feb. 10, 2021    (DE) ..................... 10 2021 103 160.5

(51) Int. Cl.
*G01N 3/46*          (2006.01)
*G01N 3/02*          (2006.01)
*G01N 3/56*          (2006.01)

(52) U.S. Cl.
CPC ................. *G01N 3/46* (2013.01); *G01N 3/02* (2013.01); *G01N 3/56* (2013.01)

(58) Field of Classification Search
CPC .............. G01N 3/46; G01N 3/02; G01N 3/56
See application file for complete search history.

(56) References Cited

U.S. PATENT DOCUMENTS 5,934,663 A  *  8/1999  Saito ...................... B65H 27/00
                                                        198/780
2005/0081599 A1    4/2005  Wortmann et al.
2014/0090445 A1*  4/2014  Norman ................... G01N 3/56
                                                        73/7
(Continued)

FOREIGN PATENT DOCUMENTS

CN        207488106 U  *  6/2018
CN        212180521 U  * 12/2020
(Continued)

OTHER PUBLICATIONS

International Preliminary Report on Patentability, issued May 25, 2023, in corresponding International Patent Application No. PCT/DE2022/100095, 14 pages.
(Continued)

*Primary Examiner* — Francis C Gray
(74) *Attorney, Agent, or Firm* — Maier & Maier, PLLC

(57) ABSTRACT
A testing device for testing a surface of a test object using an abrasion ribbon and a load body. The abrasion ribbon is guided from a provision device through a testing area, in which the abrasion ribbon can come into contact with the surface of the test object under the influence of the load body onto the abrasion ribbon, to a take-up device. The take-up device has a drive for moving the abrasion ribbon using the take-up device.

15 Claims, 7 Drawing Sheets

(56) References Cited

U.S. PATENT DOCUMENTS

| | | | |
|---|---|---|---|
| 2016/0377519 A1* | 12/2016 | Norman | .................. G01N 3/56 |
| | | | 73/7 |
| 2019/0003946 A1 | 1/2019 | Weinhold | |

FOREIGN PATENT DOCUMENTS

| | | | |
|---|---|---|---|
| DE | 10205435 C1 | 8/2003 | |
| DE | 102013010428 A1 | 12/2014 | |
| JP | 2018048993 A | 3/2018 | |
| KR | 101157640 B1 | 6/2012 | |

OTHER PUBLICATIONS

Office Action issued on Oct. 19, 2021, in corresponding German Application No. 102021103160.5, 12 pages.
International Electrotechnical Commission, "Environmental testing—Part 2: Tests Test Xb: Abrasion of markings and letterings caused by rubbing of fingers and hands", International Standard, 1995, 16 pages.
Office Action issued on Mar. 27, 2024, in corresponding Japanese Application No. 2023-548200, 8 pages.
International Search Report issued May 9, 2022, in corresponding International Patent Application No. PCT/DE2022/100095, 4 pages.
Office Action issued on Oct. 25, 2025, in corresponding Korean Application No. 10-2023-7028619, 14 pages.

\* cited by examiner

TESTING DEVICE AND METHOD FOR TESTING A SURFACE OF A TEST OBJECT

FIELD

The invention relates to a testing device for testing a surface of a specimen. It further relates to a method for testing a surface of a specimen using the testing device.

BACKGROUND

The human-induced, soft-chemo-mechanical finger or hand abrasion of a surface 202 (see FIG. 1A, where reference numeral 301 denotes a finger that acts on the surface 202 in the manner indicated by the arrow) can be simulated and realistically reproduced using testing devices. Testing devices known from the state of the art are based on the standard DIN EN ISO 60068-2-70:1996-07 in their design. FIG. 1B shows a schematic representation of a testing device 101 that can be used according to the state of the art for abrasion testing of a specimen 201, which has a surface 202 to be tested. The surface 202 of the specimen 201 to be tested is also referred to below as the test surface 202.

The abrasion test using the testing device 101 is usually carried out with a vertical arrangement of the specimen 201 or its test surface 202. The specimen 201 or the test surface 202 is held vertically clamped, and the actual loading and abrasion process takes place in a vertical direction against gravity. The testing device 101 has a load body 102, which strikes the specimen 201 or the test surface 202 at an angle of, for example, 45° or 60°, in a sliding motion, exclusively against gravity, along a defined path, which can optionally be adjusted and is referred to as the rubbing path. When the load body 102 is withdrawn from the specimen 201 or the test surface 202, the load body 102 may partially or completely lift off from the surface.

The load body 102 itself can have different geometries and material properties. In the test devices 101 mentioned above, the load body 102 is usually a silicone stamp, which is encased in a rigid sleeve, for example a metal or plastic part, which is connected to the drive unit 103. A portion of the load body 102 protrudes from the sleeve and has a defined curvature radius. The drive unit 103 has a rotatable cylinder 108, which has anon-rotating, unidirectional (double arrow $P_1$) movable piston 109 and is pivotable (double arrow $P_2$) about an axis P. The drive unit 103 enables a relative movement of the load body 102 (arrows $F_1$ and $F_2$). The curvature radius in the existing test devices is usually in the range of 10 to 50 mm, although other curvature radii can also be used. The material of the load body 102 is usually made of silicone rubber in order to simulate the elasticity of the human fingertip and human tissue. The test specimen 201 itself can have various properties. Smooth or rough, curved, or flat samples, and even movable samples such as electromechanical switches, can be tested. There are load bodies 102 with different surface roughness, different surface structures, different surface geometries and different radii of curvature. The load bodies can consist of different materials.

The actual contacting of the test surface 202 is done by a ribbon, a woven textile, a sponge-like friction medium, or another interwoven structure. The ribbon, the woven textile, the sponge-like friction medium, or the other interwoven structure are collectively referred to as abrasion ribbon. The abrasion ribbon 104 is suspended from top to bottom between the test surface 202 and the load body 102, with the lower end of the abrasion ribbon hanging loosely. The front and back of the abrasion ribbon may have different material and/or surface properties. Abrasion ribbons are known that are abrasive on only one side or are subjected to a test medium or test particles.

The abrasion ribbon 104 serves as an abrasive medium and can be used either dry or soaked with a test medium 105. The test medium can be applied automatically or manually, for example using a pipette or a spatula. It should be noted that a small weight (107) is applied to the lower end of the abrasion ribbon 104, so that the abrasion ribbon 104 is pulled downwards when no further forces are acting on it after it has been loaded with the load body. The test medium 105 can be a substance such as artificial sweat, sunscreen, toothpaste, and other substances that may come into contact with the test surface during the intended use of the test specimen 201. The test medium 105 can be directed to the abrasion ribbon 104 through a supply line 106. The test medium is also sometimes referred to as test liquid.

The testing process now proceeds as follows: The load body 102 moves towards the loose abrasion ribbon 104 hanging in front of the test specimen and tactilely takes it with it in its direction of movement, striking the test surface 202 with this abrasion ribbon 104 and performing the aforementioned abrasive movement on the test surface 202 against gravity. After reaching the end of the predetermined rubbing distance, the load body 102 lifts off and separates from the abrasion ribbon 104. The abrasion ribbon 104 is pulled down and tensioned by the weight attached to its lower end, referred to as the ribbon weight.

After a predetermined number of test load cycles, the abrasion ribbon 104 is moved a defined distance downwards so that the friction contact area—which is the area of the abrasion ribbon in contact with the test surface—has a fresh abrasive surface, which now forms the friction contact area. This is necessary because in tribological testing, both surfaces, i.e., the test surface and the friction contact area, wear out. The feeding of the fabric for the abrasion ribbon 104 can be done horizontally with a fabric roll or through a 90-degree deflection, for example, through a deflection roll, either motorized or dragging.

To ensure the reproducibility of a test, it is necessary to ensure that:

(i) The feed of the abrasion ribbon always occurs in the same number of rubbing cycles.

(ii) The abrasion ribbon 104 does not stick to the test surface 202.

(iii) The coefficient of friction between the load body 102 and the abrasion ribbon 104 is always greater than the coefficient of friction between the abrasion ribbon 104 and the test specimen 201 so that the abrasion ribbon 104 adheres to the load body 102 instead of the test specimen 201.

If the load body were to slide or rub against the abrasion ribbon, the surface roughness, geometry, and the corresponding effective contact area would continuously change through the abrasion ribbon onto the test specimen. As a result, the load body would become unusable, and the test would no longer be reproducible.

Especially when using liquid aqueous, oily, or fatty substances as additional test media 105, which also contain solid particles, there may be an increased risk of the abrasion ribbon 104 adhering to the test surface 202. This process also occurs unpredictably, so the entire test, along with all its test cycles, must be closely and costly monitored to avoid false measurements. It is especially important to ensure that the weight attached to the abrasion ribbon 104 at the bottom is pulled upwards during the load case—i.e., when the abrasion ribbon 104 is loaded with the load body 102—and falls back down after completion of the rubbing distance.

Another problem arises from the limited length of the abrasion ribbon available for a test run. After a certain number n of movement cycles of the abrasion ribbon 104, the weight attached to it comes into contact with, for example, the surface of the laboratory table on which the entire test device 101 is located, and thereby loses its function of tensioning the abrasion ribbon 104. Some users have therefore cut a hole in the laboratory tabletop so that the abrasion ribbon 104, along with its weight, can move all the way to the floor. However, the disadvantage of this solution is that the downward pulling force, due to the physical weight of the weight, and the physical weight of the abrasion ribbon, steadily increases and is therefore not constant. Additionally, the abrasion ribbon is stretched, resulting in continuous changes in its abrasion and load characteristics. Furthermore, the pendulum length of the abrasion ribbon increases.

DE 102 05 435 C1 discloses a device for determining the wear resistance of a surface. For this purpose, an abrasion ribbon is guided from an unwinder to a winder. The abrasion ribbon is pressed against the surface by a load body during ribbon travel. A device for measuring the wear of the surface of an object is known from US 2014/0090445 A1, in which an abrasion ribbon is guided from an unwinder to a winder. The ribbon is pressed against the surface by means of a finger probe. The ribbon moves during the test.

SUMMARY

The task of the invention is to eliminate the disadvantages of the state of the art. In particular, a testing device for testing a surface of a test specimen should be provided, which on the one hand prevents adhesion of the abrasion ribbon to the surface of the test specimen, and on the other hand reduces the risk of changing the ribbon weight.

According to the invention, a testing device is provided for testing a surface of a test specimen using an abrasion ribbon and a load body. The abrasion ribbon is fed in sections from a supply device, passing through a test area where the abrasion ribbon can come into contact with the surface of the test specimen under the influence of the load body, to a winding device. It is characterized in that the winding device has a drive for moving the abrasion ribbon by means of the winding device.

The testing device according to the invention allows for the winding of the used abrasion ribbon using the winding device. This prevents the abrasion ribbon from adhering to the surface of the test specimen. In addition, it helps reduce the risk of changes in the ribbon's weighting and swinging motion. The winding device can also provide tensioning of the abrasion ribbon on the test specimen, for example, after experiencing friction and/or impact stress. The testing device according to the present invention can include an adjustment device for adjusting the tensioning force applied by the winding device on the abrasion ribbon. The adjustment of the tensioning force can be done manually or using an electric motor. The adjustment device for adjusting the tensioning force applied by the winding device on the abrasion ribbon can be a spring adjustment device or a weight body adjustment device. The spring adjustment device can adjust the tensioning force using a spring and can be either manually operated or powered by an electric motor. The weight body adjustment device can adjust the tensioning force using a weight body and can be either manually operated or powered by an electric motor. The tensioning force can be adjusted depending on the fabric type of the abrasion ribbon and/or the type of test medium used.

The abrasion ribbon is transported in sections from the supply device, passing through the test area where the abrasion ribbon can come into contact with the surface of the specimen through the load body, to the winding device. The abrasion ribbon is only brought into contact with the surface of the specimen if the transport of the abrasion ribbon from the supply device to the winding device is interrupted. If the abrasion ribbon is transported from the supply device to the winding device, the abrasion ribbon is not in contact with the surface of the specimen. The abrasion ribbon is thus transported discontinuously.

The abrasion ribbon can be an already known abrasion ribbon itself. The abrasion ribbon can serve as an abrasive medium. It can be either dry or soaked with a test medium. The test medium can be applied either through a device or manually, for example via a pipette or with the help of a spatula. The abrasion ribbon can also be used to soil the surface of the test specimen. It can therefore also be referred to as soiling ribbon. The abrasion ribbon can also be used to clean the surface of the test specimen. It can therefore also be referred to as cleaning ribbon.

The drive of the test device according to the invention can be a motor for rotating the winding device while winding or unwinding the abrasion ribbon. The motor is also referred to as a winding motor below. The test device according to the invention can have a supply device from which the abrasion ribbon is unwound. The supply device can have a drive. The supply device can thus be actively driven. Alternatively, the supply device can have a friction clutch. The abrasion ribbon can be guided from the unwinder to the winding device via the test area. For this purpose, the test device according to the invention can have one or more guide rolls. The abrasion ribbon can be provided as a roll material in the form of a coil.

The test device according to the invention can have a dancing bar that is movable between an upper position and a lower position. The dancing bar can be used to divert the abrasion ribbon to the winding device. The dancing bar can ensure tensioning of the abrasion ribbon on the test specimen, for example after friction and/or impact stress. The dancing bar can thus replace the weight alone or together with the winding device. The test device according to the invention can have an adjustment device for adjusting the tensioning force exerted by the dancing bar on the abrasion ribbon. The adjustment device can preset a tensioning force that the dancing bar should exert in its lower position. The adjustment device for adjusting the tensioning force exerted by the dancing bar on the abrasion ribbon can be a spring adjustment device or a weight body adjustment device. The spring adjustment device can achieve the adjustment of the tensioning force by means of a spring. The spring adjustment device can be a manual or an electromotive spring adjustment device. The weight body adjustment device can achieve the adjustment of the tensioning force by means of a weight body. The spring adjustment device can also be a manual or an electromotive spring adjustment device. The tensioning force can be adjusted depending on the fabric type of the abrasion ribbon and/or the test medium used.

The dancing bar can be a rotating dancing bar. The rotating dancing bar can be mounted on a dancing bar holder which can be rotatably supported about an axis of rotation $(T_1)$. It can be provided that the dancing bar holder is rotatably supported about an axis of rotation $(T_2)$ which is parallel to the axis of rotation $(T_1)$ of the dancing bar and spaced apart therefrom. It can be provided that an axis of rotation $(T_1)$ of the dancing bar is in its lower position in a first vertical plane and in its upper position in a second vertical plane which is spaced apart from the first vertical plane. It can be provided that, if the dancing bar does not reach the lower position for any reason, the testing of the test specimen is stopped, since otherwise an incorrect test would be carried out and/or the end of the abrasion ribbon would be reached.

The test device according to the invention can have a detection device for detecting the position of the dancing bar. The detection device for detecting the position of the dancing bar can be, for example, a position measuring device, a position sensor or a position switch. The position measuring device can be for example an optical detection device. The position of the dancing bar can be detected with the detection device and transmitted to a control device. Especially the position of the dancing bar can be detected electronically. This electronically detected position can be transmitted as signal to the control device.

The control device can be a central control device for controlling the test device according to the invention. Alternatively, a local control device can be provided to control one or more components, such as the winding device and/or the dancing bar. The control device can be an electronic data processing device, such as a computer.

The test device according to the invention can have a load body that corresponds to load bodies used in previously known testing devices. By means of the load body, the section of the abrasion ribbon that is located in the test area can be brought into contact with the surface of the test specimen. Before the load body acts on the abrasion ribbon, the guidance of the abrasion ribbon from the supply device to the feed roll is interrupted, i.e. the section of the abrasion ribbon that is located in the test area remains in the test area while the load body acts on the abrasion ribbon, for example for a predetermined number of abrasion cycles. The number of abrasion cycles refer to the number of cycles in which the load body is to act on the section of the abrasion ribbon located in the test area. Only after completing the predetermined number of abrasion cycles, the section of the abrasion ribbon located in the test area, which is now used, is replaced by a new, unused section.

The testing device according to the invention may have a bearing for the load body as well as a drive unit for moving the load body. The drive unit may have a rotatably mounted cylinder, which has a non-rotating, unidirectionally movable piston and enables a relative movement of the load body. In this case, the load body is spaced apart from the abrasion ribbon in a first position, i.e. it does not contact the abrasion ribbon and does not press the abrasion ribbon against the surface of the test specimen. In a second position, the load body is in contact with the surface side of the abrasion ribbon facing it, pressing the other surface side of the abrasion ribbon against the surface of the test specimen. By means of the drive element, the load body can be moved from a first position to the second position and from the second position to the first position. While the load body is in the second position, the abrasion ribbon is not moved by means of the feed roll. The load body can be arranged in the testing device in such a way by means of its bearing that it is completely or partially located in the testing area. The load body preferably has a contact surface, which comes into contact with the surface side of the abrasion ribbon facing it when the load body is moved into its second position. It can be provided that this contact surface is located in the testing area when the load body is in its second position. It can additionally be provided that this contact surface is located in the testing area when the load body is in its first position.

The load body is not in contact with the test specimen. It can be provided that the contact surface of the load body in its second position is opposite the surface of the test specimen. It can be aligned parallel to the surface of the test specimen.

The abrasion ribbon used can be a known abrasion ribbon, as used in previously known testing devices. Using the testing device according to the invention, the abrasion ribbon is guided into the testing area in such a way that one of its surface sides faces the surface of the test specimen to be tested. In the testing area, the test specimen is preferably arranged in such a way that its surface to be tested is essentially vertically oriented. The testing device according to the invention may have a holding device for holding the test specimen in the testing area, for example a holding device in which the test specimen is clamped. The holding device keeps the test specimen immobile. The test specimen is not moved during the test.

By means of the detection device, it can be ensured that cleaning of the abrasion ribbon can only take place when the abrasion ribbon is not in contact with the surface of the test specimen. If the abrasion ribbon is not in contact with the surface of the test specimen, a gap is formed between the abrasion ribbon and the surface of the test specimen. Cleaning of the abrasion ribbon can be carried out, for example, by blowing it off, preferably automated blowing off.

The testing device according to the invention may have one or more guide rolls for guiding the abrasion ribbon. It may be provided that one or more guide rolls are arranged between the testing area and the winding device, i.e. the abrasion ribbon can be guided to the winding device by means of one or more guide rolls after the testing area. One or more guide rolls may be arranged between the dancing bar and the winding device, i.e. the abrasion ribbon can be guided to the winding device by means of one or more guide rolls after the dancing bar. At least one of the guide rolls may be a deflecting roll. The testing device according to the invention may thus have one or more deflecting rolls for guiding the abrasion ribbon. For example, one or more deflecting rolls may be arranged between the dancing bar and the winding device.

The abrasion ribbon is fed discontinuously from the supply device to the winding device. In the process, the abrasion ribbon is wound section by section onto the winding device. With the winding of a section onto the winding device, a section of the abrasion ribbon that was previously in the testing area is replaced by a new section of the abrasion ribbon. The length of the wound section is referred to hereinafter as the feed length. The length of the section that is fed out of the testing area essentially corresponds to the feed length. The length of the section that is led into the testing area also essentially corresponds to the feed length. The term "essentially" is intended to indicate any deviations between the feed length and the actual length of the section that is fed out of or into the testing area that may result, for example, from the adjustment of the tension of the abrasion ribbon or the tensioning force exerted by the winding device on the abrasion ribbon. The section of the abrasion ribbon that is fed out of the testing area is also referred to hereinafter as the "used section," and the section of the abrasion ribbon that is fed into the testing area is also referred to hereinafter as the "unused section".

The testing device according to the invention can have a device for determining the feed length of the abrasion ribbon. It can be provided that with this device the feed length of the abrasion ribbon is determined during feeding. The term "feeding" refers to the replacement of a section of the abrasion ribbon that has already been used to test the surface of the test object with a previously unused section of the abrasion ribbon. For this purpose, the used section of the abrasion ribbon is pulled out of the testing area by means of the winding roll and replaced by the unused section of the abrasion ribbon. The winding up can be associated with a rotation of at least one roll, for example the guiding roll or dancing bar, which is determined by the device for determining the feed length of the abrasion ribbon. For example, measurement signals can be received by the device for determining the feed length of the abrasion ribbon, which are forwarded to the central control device of the testing device according to the invention and/or processed in a local electronics device of the device for determining the feed length of the abrasion ribbon. The device for determining the feed length of the abrasion ribbon can also be used to determine the total length of the wound abrasion ribbon. The remaining length of the abrasion ribbon for testing can be determined from the total length of the wound abrasion ribbon and the total length of the abrasion ribbon. If this length falls below a predetermined value, a warning message can be issued via a warning device. The warning device can, for example, be an optical and/or acoustic warning device. The optical warning device can, for example, be a display on which the warning message is displayed. The testing device according to the invention can thus have a display for outputting such a warning message.

It may be provided that one of the guide rolls or the dancing bar has a device for determining the feed length of the abrasion ribbon. The device for determining the feed length of the abrasion ribbon can, for example, be a position switch or position sensor that determines the position of the guide roll or dancing bar. This way, for example, the number of rotations of the guide roll or dancing bar can be determined. In one design, the device for determining the feed length of the abrasion ribbon is a tachometer disc. The tachometer disc can be attached to the guide roll or dancing bar.

It may be provided that at least one of the guide rolls has guide elements that prevent movement of the abrasion ribbon in the axial direction, relative to the axis of rotation of the guide roll. Alternatively, or additionally, the dancing bar may have guide elements that prevent movement of the abrasion ribbon in the axial direction, relative to the axis of rotation of the dancing bar. The guide elements may be continuous ridges that extend radially from the surface of the guide roll or dancing bar. The guide elements are also referred to as lateral guide elements because the longitudinal edges of the abrasion ribbon face the guide elements. The abrasion ribbon lies against the surface of the guide roll or dancing bar with one of its sides when it is guided to the winding roll. The surface is the surface of the shaft of the respective guide roll or the surface of the dancing bar. The longitudinal axis of the shaft is the axis of rotation of the guide roll or dancing bar.

According to the state of the art, the abrasion ribbon was only guided in the area above the test area. This often resulted in lateral pendulum movements of the abrasion ribbon, whose amplitude was also increased by the weight of the weight. By means of the guide rolls, which are arranged between the test area and the winding device, and/or the dancing bar, a lateral pendulum movement of the abrasion ribbon can be prevented. For this purpose, it can be advantageous if at least one of the guide rolls and/or the dancing bar has guide elements. Preventing lateral pendulum movement allows for the use of an abrasion ribbon with a narrower width compared to the state of the art, which is associated with material and cost savings.

If the testing device according to the invention has guide rolls with guide elements, the distance between the guide elements of these guide rolls is preferably adjustable. The term "distance" refers to the axis of rotation of the guide roll. If the testing device according to the invention has a dancing bar with guide elements, the distance between the guide elements of the dancing bar is preferably adjustable. The term "distance" refers to the axis of rotation of the dancing bar. The testing device according to the invention can be adjusted to abrasion ribbons of different widths by adjusting the distance between the guide elements of a guide roll and/or the dancing bar. For example, if an abrasion ribbon of a first width is to be replaced by an abrasion ribbon of a second width, which is larger or smaller than the first width, the distance between the guide elements is adjusted for all guide rolls that have guide elements and, if available, the dancing bar, if it has guide elements.

To change the distance between the two guide elements of a guide roll or the dancing bar, at least one of the two guide elements can be adjustably attached to the guide roll or the dancing bar. For example, a guide element or the dancing bar can have a fixing element for detachably fixing the guide element to the guide roll or the dancing bar. After loosening the fixing element, the fixing element can be moved in a predetermined position in the axial direction with respect to the axis of rotation of the guide roll or the dancing bar, and can be fixed in this position by means of the fixing element. The fixing element can, for example, be a screw with which the guide element is fixed to the shell of the guide roll or the dancing bar. Preferably, both guide elements can be adjustable. The shell is the shell of the shaft of the respective guide roll or the surface of the dancing bar. By means of the fixing element, for example the screw, the guide element can be fixed to the outside of the shell.

Alternatively, the change in distance between the two guide elements of a guide roll or the dancing bar could be achieved by providing the guide roll or the dancing bar with an adjustable shaft that can be lengthened or shortened. The predetermined length of the shaft can be releasably fixed using a locking element. An example of an adjustable shaft could be a telescopic shaft. The two guide elements could be arranged on the end faces of the telescopic shaft. Changing the length of the telescopic shaft is associated with a change in the distance between the two guide elements. In one design, the telescopic shaft is a hollow shaft that can be divided into two halves in the middle, wherein the two halves of the shaft can slide into each other and be locked in any position.

The winding device can be a winding roll. The winding roll can also be referred to as an taking roll. If the winding device is a winding roll, the winding roll may have guide elements that prevent movement of the abrasion ribbon in the axial direction, relative to the axis of rotation of the winding roll. The guide elements may be circumferential ridges that extend radially from the shell of the winding roll. The shell is the shell of the shaft of the winding roll. The longitudinal axis of the shaft is the axis of rotation of the winding roll. Preferably, the distance between the guide elements of the winding roll is adjustable. For this purpose, the guide elements, as described in connection with the guide rolls, can be adjustable, or the shaft of the winding roll, as also described in connection with the guide rolls, can be an extendable shaft.

If the testing device according to the invention has an unwinder, the unwinder can be a feed roll. The feed roll can also be referred to as the giving roll. If the unwinder is a feed roll, the feed roll can have guide elements that prevent movement of the abrasion ribbon in the axial direction, relative to the axis of rotation of the feed roll. The guide elements can be circumferential ridges that extend radially from the shell of the feed roll. The shell is the shell of the shaft of the feed roll. The longitudinal axis of the shaft is the axis of rotation of the feed roll. Preferably, the distance between the guide elements of the feed roll is adjustable. For this purpose, the guide elements, as already described in connection with the guide rolls, can be adjustable or the shaft of the feed roll, as also already described in connection with the guide rolls, can be an extendable shaft.

If the testing device according to the invention does not have an unwinder, but a trough feed, an adjustment of the trough to the width of the abrasion ribbon can be provided. For example, the width of the trough can be adjustable. Alternatively or additionally, one or more spacer elements, can be provided. The spacer elements can be placed in the trough in such a way that they rest against an inner wall of the trough, thereby reducing the width of the interior space of the trough. By removing one or more spacer elements from the trough, the width of the interior space can be increased again. The side walls of the carrier, against which the spacer elements rest, can be the side walls facing a longitudinal edge of the abrasion ribbon. By using one or more spacer elements, the width of the trough can be adjusted laterally to the necessary width.

In order to enable retrofitting of an existing testing device, it may be provided that the winding of the used abrasion ribbon is provided as a module. This module can be installed in an existing testing device. The module includes the winding device. It may also include one or more guide rolls and/or the dancing bar. It may also have a device for determining the length of the abrasion ribbon. The supply of the winding of the used abrasion ribbon as a module allows for the addition of known guiding systems for the abrasion ribbon in existing testing devices that provide for the feeding of the abrasion ribbon by means of a roll or trough feed. The integration of the winding of the abrasion ribbon can be done either directly in the central control of the testing device or via a local control. The module can have a frame to which the winding device and, if available, the other elements of the module are attached. In one design of the invention, the module includes not only the winding device but also the supply device. Thus, the module can also be designed as a feed and winding roll. The feed and winding roll may have one or more guide rolls and/or the dancing bar. It may also have a device for determining the length of the abrasion ribbon.

Apart from the guidance of the abrasion ribbon by means of the winding device and, if provided, one or more guide rolls and/or the dancing bar, the testing device according to the invention can correspond to known testing devices from the state of the art. The testing device according to the invention may in particular include one or more devices that are known from the state-of-the-art testing devices. However, the testing device according to the invention does not have any weight at the end of the abrasion ribbon. The testing device according to the invention may, for example, include a drive unit for moving the load body, which corresponds to the drive unit known from the state of the art. It may also include another drive unit known from the state of the art for moving the load body. It may also have a supply line for a test medium, which corresponds to the supply line known from the state of the art.

Using a counting roll, the length of the abrasion ribbon that has been wound onto the winding device can be determined. The counting roll can be the dancing bar. Alternatively or additionally, at least one of the guide rolls can be a counting roll.

According to the invention, a method for testing a surface of a specimen using the testing device according to the invention is provided, wherein an abrasion ribbon is sectionally led from a supply device, passing through a testing area in which the abrasion ribbon is brought into contact with the surface of the specimen under the influence of a load body, to a winding device, wherein the abrasion ribbon is movable by means of a drive that drives the winding device.

It may be provided that the tension of the abrasion ribbon is adjusted by rotating the winding device. By rotating in a first direction, the abrasion ribbon can be wound onto the winding device. By winding up the abrasion ribbon, the section of the abrasion ribbon that is located in the testing area and has usually already been used for testing can be pulled out of the testing area and replaced by a new, unused section of the abrasion ribbon. However, by rotating the winding unit in the first direction or in the opposite direction to the first direction, the tension of the abrasion ribbon can also be adjusted.

The supply device may be a feed roll or, in the case of a trough feed, a trough.

The method and the device according to the invention allow for the guidance of an abrasion ribbon while adjusting its tension from the supply device to the winding device. This eliminates the need for a weight attached to the end of the abrasion ribbon. Further details of the method have already been described in connection with the device according to the invention. Reference is made to these details.

The method and device according to the invention ensure reproducibility of the surface testing of a specimen. In particular, it can be ensured that the abrasion ribbon is always fed after the same number of abrasion cycles and does not adhere or stick to the surface of the specimen. For this purpose, a gap between the abrasion ribbon and the surface of the specimen can be adjusted by changing the tension of the abrasion ribbon in the test area.

After the surface of the specimen has been brought into contact with the abrasion ribbon in the specified number of cycles, the surface of the specimen can be assessed using known methods. For example, the roughness of the surface can be assessed, e.g., using a roughness measuring probe or optical methods.

BRIEF DESCRIPTION OF THE FIGURES

The invention will be explained in more detail below with reference to exemplary designs, which should not restrict the invention, and with reference to the drawings. In this regard, the following is shown.

DETAILED DESCRIPTION

Figure 1A:
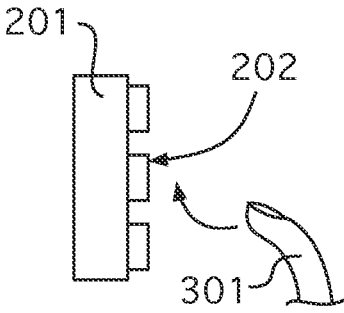
FIG. 1A a schematic representation of a surface to be touched by a finger.
Figure 1B:
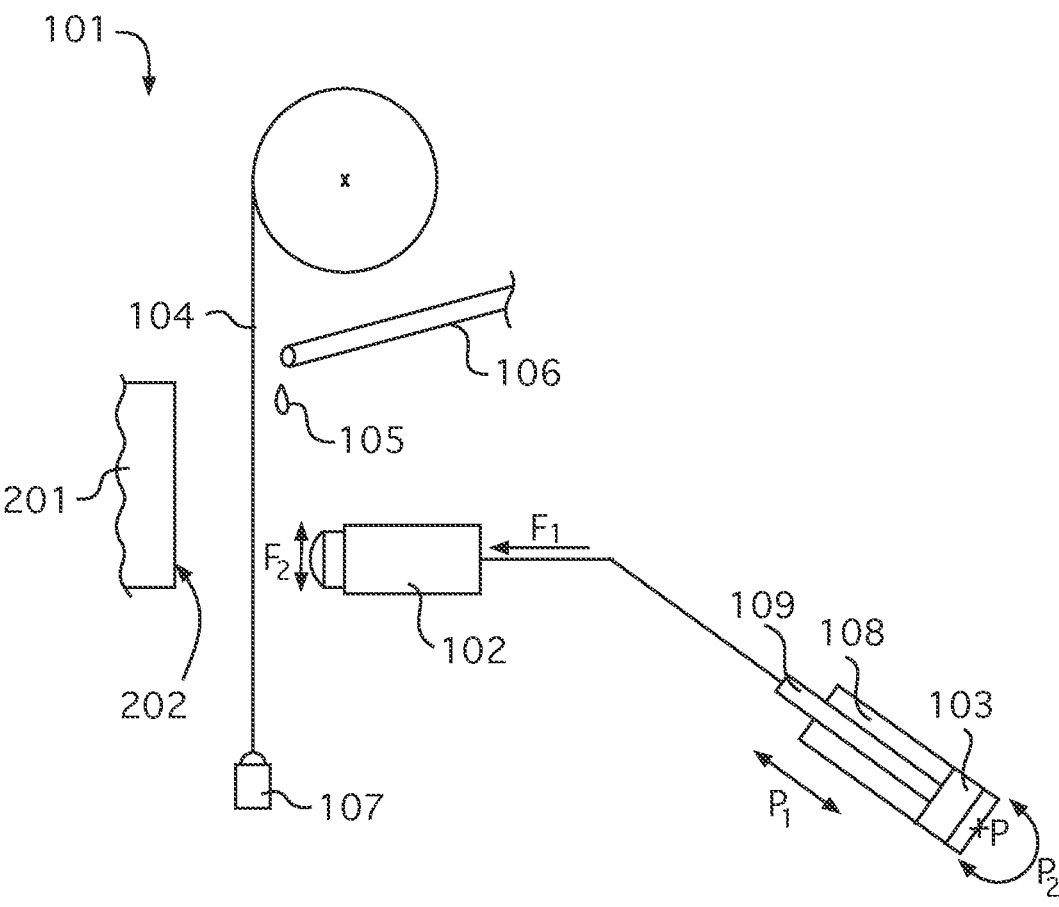
FIG. 1B a schematic representation of an exemplary testing device according to the state of the art.
Figure 2A:
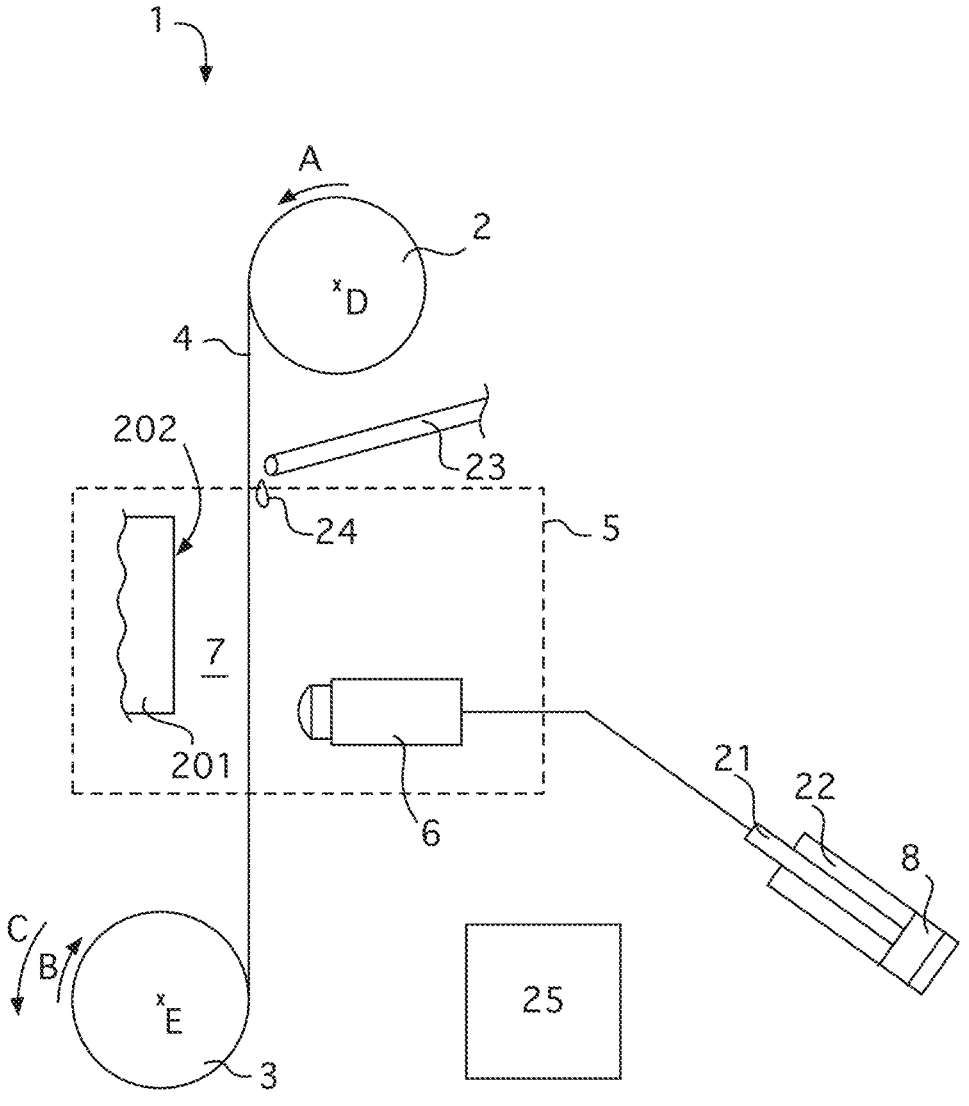
FIG. 2A a schematic representation of a first design of a testing device according to the invention when the abrasion ribbon is being transported.
Figure 2B:
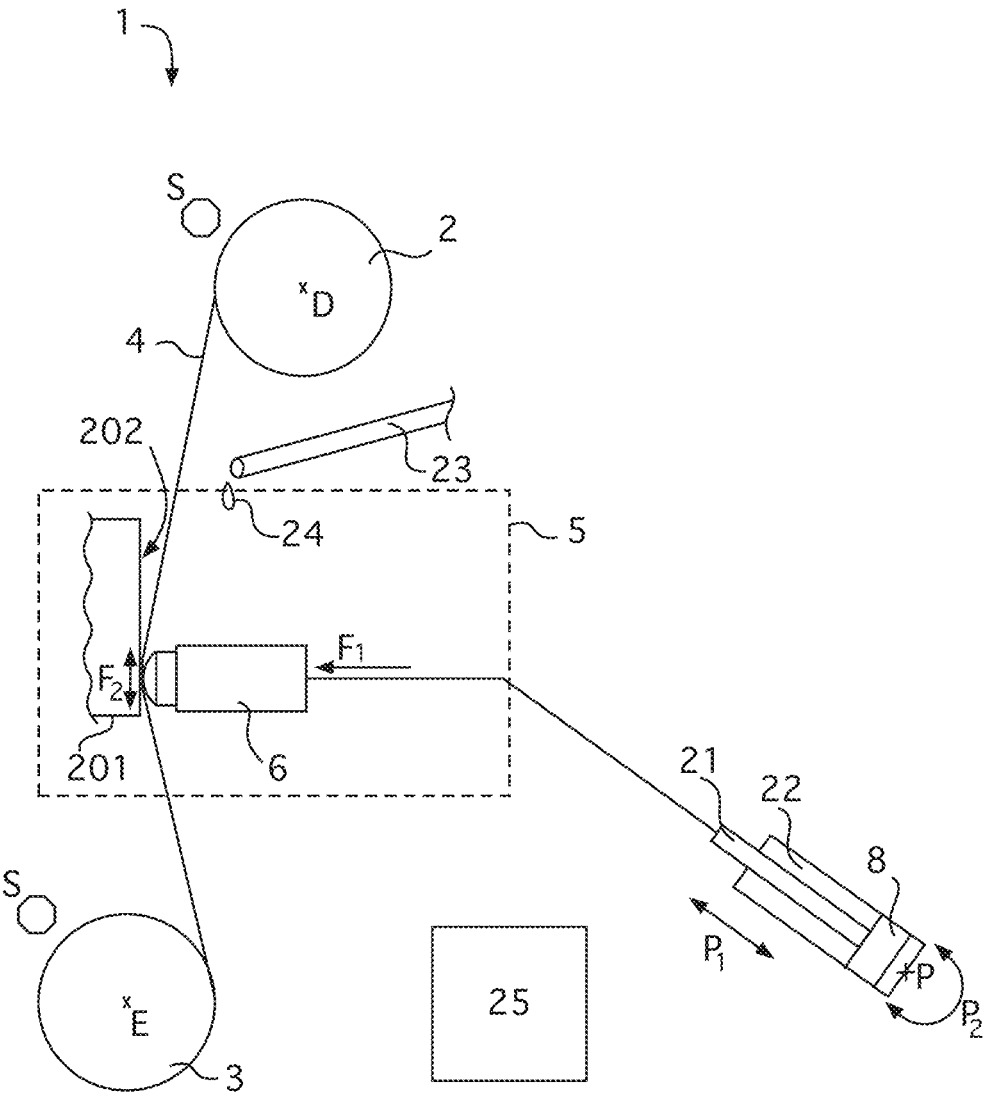
FIG. 2B a schematic representation of a first design of a testing device according to the invention when the load body is applied to the abrasion ribbon.
Figure 2C:
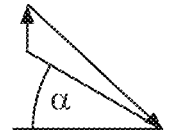
FIG. 2C a schematic representation of a sequence of movements of a load body during testing.

The first design of the testing device 1 according to the invention, shown in FIGS. 2A-2C, comprises a feed roll 2 and a winding roll 3. An abrasion ribbon 4 is unwound from the feed roll 2 and guided through the testing area 5 to the winding roll 3, onto which the abrasion ribbon 4 is wound up. In the testing area 5, the specimen 201 is arranged in such a way that its test surface 202 is in a vertical position. The section of the abrasion ribbon 4 that is located in the testing area 5 is aligned in such a way that, as long as the load body 6 does not exert any force on the abrasion ribbon 4, the surface sides of the abrasion ribbon 4 run parallel to vertical planes and at a distance from the test surface 202 of the specimen 201, forming a gap 7.

The feed roll 2 has a rotation axis D. The winding roll 3 has a rotation axis E. The rotation axes D and E are located horizontally and run parallel to each other. The rotation axis E is spaced apart from the rotation axis D and is lower than the rotation axis D. The feed roll 2 and the winding roll 3 can each be rotatably mounted on a common frame. The feed roll 2 and the winding roll 3 can be arranged such that the abrasion ribbon 4 is in a vertical position in the testing area 5.

The abrasion tape 4 is unwound section by section from the feed roll 2 for testing the test surface 202 of the specimen 201 (arrow A). For this purpose, the winding roll 3 has a motor (not shown). By rotating the winding roll 3 in a first direction (arrow B), the abrasion ribbon 4 is wound section by section onto the winding roll 3. In doing so, the section located in the test area 5, preferably after its use for testing the surface 202, of the abrasion ribbon 4 is guided out of the test area 5. At the same time, anew, unused section of the abrasion ribbon 4 enters the test area 5. Once the new, unused section of the abrasion ribbon 4 has entered the test area 5, the winding of the abrasion ribbon onto the winding roll 3 is stopped (octagon S). However, if necessary, the tension of the abrasion ribbon can be adjusted. For this purpose, the winding roll 3 is rotated in the first direction (arrow B) or in the opposite direction (arrow C) about its axis of rotation (E), until the abrasion ribbon 4 has the specified tension. To adjust the tension, the winding device 3 can be rotated multiple times in the first direction or in the second direction, or alternately in one direction and then the other.

If the new, unused section of the abrasive ribbon 4 is located in the test area 5 and the abrasive ribbon 4 has the specified tension, the testing of the surface 202 of the specimen 201 can begin. It may be possible that the abrasive ribbon 4 is not moved by means of the winding roll 3 during the test.

The test can be performed in the manner known from the state of the art. For this purpose, the load body 6 acts on the surface side of the abrasion ribbon 4, which faces away from the surface 202 of the test specimen 201. The load body 6 can be moved by the drive unit 8 in such a way that it is moved at an angle $\alpha$ towards the surface 202 and thereby presses the abrasion ribbon 4 against the surface 202, as shown in FIG. 2B. The drive unit 8 has a rotatably mounted cylinder 21, which has a non-rotating piston 22 movable unidirectionally (double arrow $P_1$) and is pivotable (double arrow $P_2$) about a horizontal axis P. The drive unit enables a relative movement of the load body 6 (arrows $F_1$ and $F_2$). The load body 6 can perform a sliding movement, exclusively against the force of gravity. It can be moved on a defined path, which can optionally be adjusted and is referred to as a rubbing path. Subsequently, the load body 6 can be moved away from the abrasion ribbon 4, whereby the abrasion ribbon 4 is released from the surface 202. An exemplary movement of the load body 6 is shown in FIG. 2C as a trajectory. The described movement of the load body towards the surface 202 at the angle $\alpha$, the sliding movement of the load body while pressing the abrasion ribbon 4 against the surface 202, and the subsequent movement of the load body back, whereby the abrasion ribbon 4 is released from the surface 202, can form a cycle. This cycle can be repeated several times. The angle $\alpha$ can be, for example, 45° or 60°.

The stress of the surface 202 is carried out for a predetermined number of cycles. The section of the abrasion ribbon 4 located in the test area 5 is not changed. After the predetermined number of cycles have been completed, the section of the abrasion ribbon 4 that has now been used is replaced with a new unused section by winding a section of the abrasion ribbon onto the winding roll 3. This wound section has a predetermined length, referred to as the feed length. The feed length corresponds to the length of the abrasion ribbon 4 that needs to be wound in order for the new unused section to enter the test area 5 and occupy the test area 5 in such a way that the testing of the surface 202 can now be conducted with this new unused section. To determine the feed length, a position sensor (not shown) may be provided to determine the position of the winding roll. In this way, position data can be obtained and transmitted to a central or local control device 25. The control device 25 can cause the winding roll 3 to rotate (arrow B) via the motor. In order to adjust the tension of the abrasion ribbon 4, the control device 25 can also cause the winding roll 3 to rotate in the direction of arrow B or C.

The abrasion ribbon 4 can be used either dry or soaked with a test medium 24. The test medium 24 can be applied either automatically or manually, for example, by a pipette or a spatula. The test medium 24 can be a substance such as synthetic sweat, sunscreen, toothpaste, or other substances that the test surface may come into contact with during the intended use of the test specimen 201. The active medium 24 can be guided to the abrasion ribbon 4 via a supply line 23.

Figure 3:
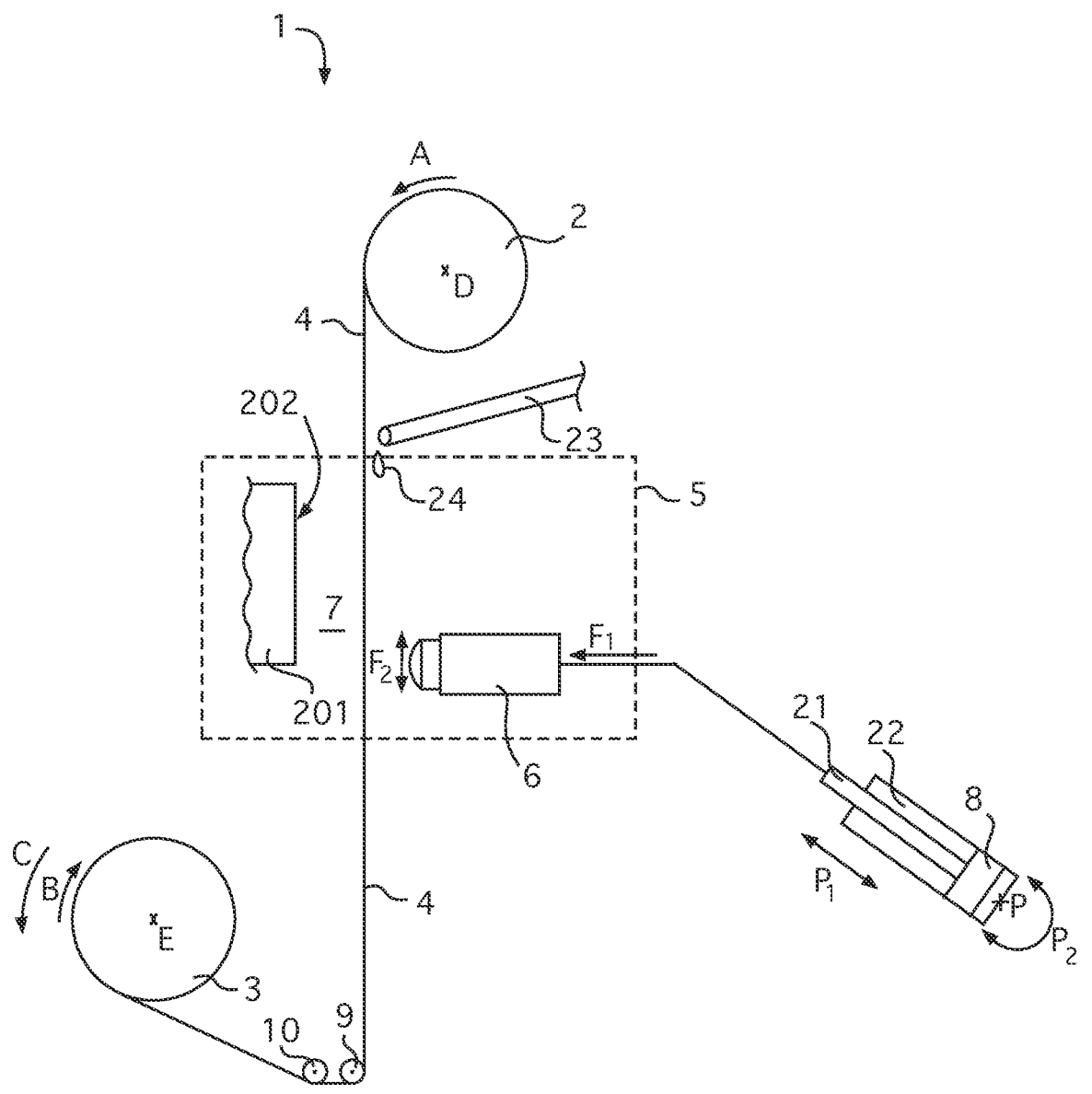
FIG. 3 a schematic representation of a second design of a testing device according to the invention.

The second design of the test device 1 according to the invention shown in FIG. 3 corresponds to the first design shown in FIG. 2A. However, in addition, two guide rolls 9, 10 are provided for guiding the abrasion ribbon 4. The two guide rolls 9, 10 are used to guide the abrasion ribbon 4 emerging from the test area 5 to the winding roll 3. The two guide rolls have horizontal axes of rotation that run parallel to the axes of rotation D, E of the feed roll 2 and the winding roll 3. The two guide rolls 9, 10 can also be rotatably mounted on the frame on which the feed roll 2 and the winding roll 3 are already rotatably mounted, about their axes of rotation.

The first guiding roll 9 is a diversion roll and is arranged in such a way that the abrasion ribbon 4 is guided through the testing area 5 in a vertical position. This can be achieved by a corresponding arrangement of the guiding roll 9 to the feed roll 2. In contrast to the first design, the vertical position of the abrasion ribbon 4 is not achieved by the alignment of the winding roll 3 to the feed roll 2 in the testing area 5. The first guiding roll 9 is arranged lower than the winding roll 3 in the third design shown in FIG. 3.

The abrasion ribbon 4 passes from the feed roll 2 through the testing area 5 to the first guiding roll 9. The abrasion ribbon 4 is guided from the first guiding roll 9 to the second guiding roll 10, whose axis of rotation is in the same horizontal plane as the axis of rotation of the first guiding roll 9. The second guiding roll 10 serves as a counting roll. It can serve as a device for determining the length of the abrasion ribbon. The length of the abrasion ribbon that has been wound onto the winding roll 3 can be determined using the counting roll. The length determined by the counting roll can be transmitted to a central or local control device (not shown). The control device can cause rotation of the winding roll 3 (arrow B) via the motor. To adjust the tension of the abrasion ribbon 4, the control device can also cause rotation of the winding roll 3 in the direction of arrow B or C. The abrasion ribbon 4 lies with its surface side facing the surface 202 of the test specimen 201, both on the first guiding roll 9 and on the second guiding roll 10.

Figure 4:
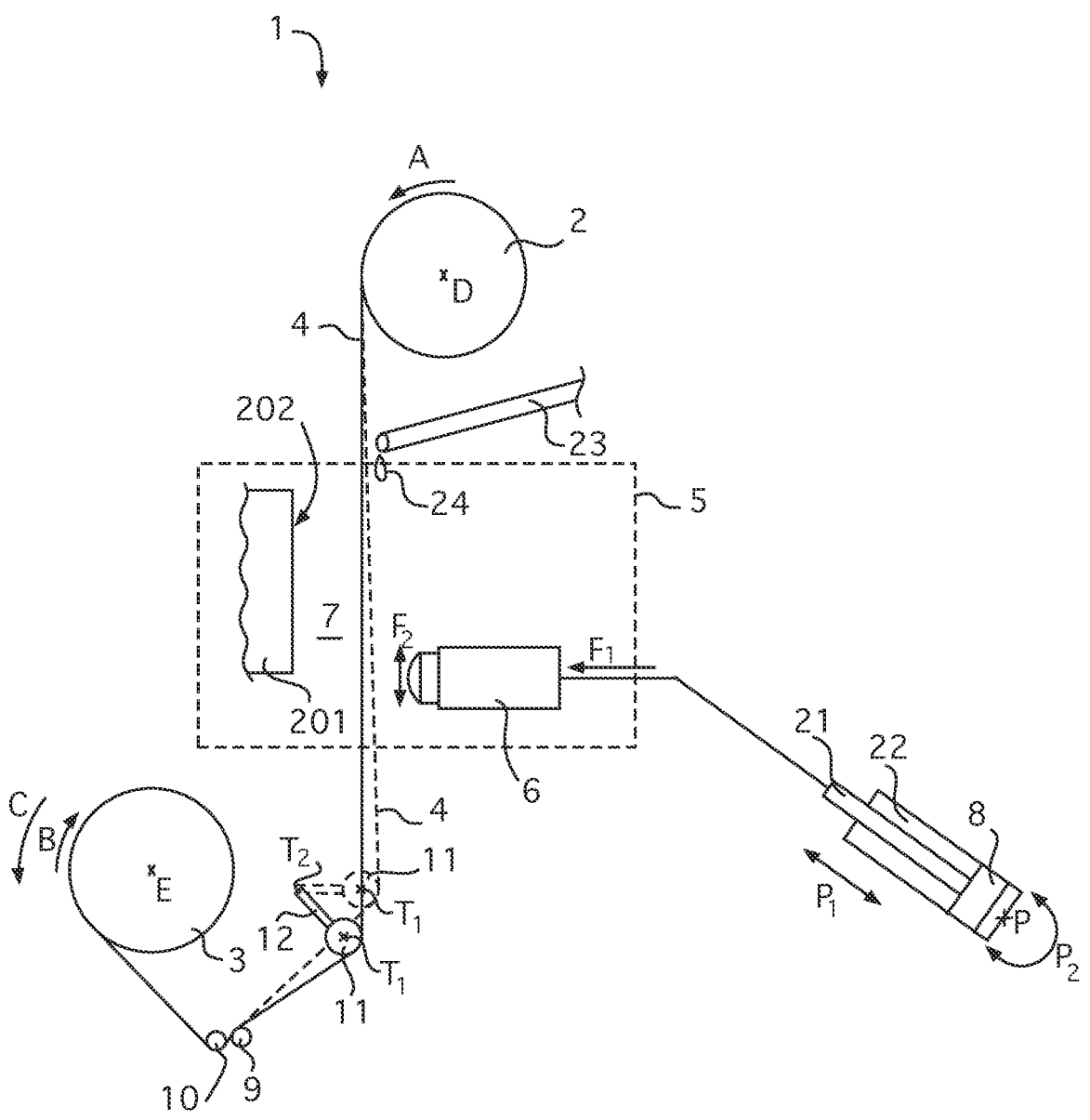
FIG. 4 a schematic representation of a third design of a testing device according to the invention.

The third design of a testing device 1 according to the invention shown in FIG. 4 corresponds to the second design shown in FIG. 3, except that an additional dancing bar 11 is provided to guide the abrasion ribbon 4 and the abrasion ribbon 4 is guided through a gap formed between the two guiding rolls 9 and 10. The dancing bar 11 is rotatably mounted on a dancing bar holder 12. The dancing bar holder 12 is rotatably mounted about an axis of rotation (T2) that is parallel to the axis of rotation (T1) of the dancing bar and spaced apart from it. For this purpose, the dancing bar holder 12 can be rotatably mounted on the common frame. The axis of rotation (T1) and the axis of rotation (T2) are in the horizontal plane and run parallel to the axes of rotation of the feed roll 2, the guiding rolls 9 and 10, and the winding roll 3.

The dancing bar 11 is arranged in such a way that the abrasion ribbon 4 is guided through the testing area 5 in a vertical position when the dancing bar 11 is in its lower position. This can be achieved by a corresponding arrangement of the dancing bar 11 to the feed roll 2. In contrast to the second design, the vertical position of the abrasion ribbon 4 in the testing area 5 is not achieved by the alignment of the first guiding roll 9. In the design shown in FIG. 4, the dancing bar 11 is arranged above the first guiding roll 9.

The abrasion ribbon 4 passes from the feed roll 2 through the testing area 5 to the dancing bar 11 and from there to the first guiding roll 9. The abrasion ribbon 4 then passes through the second guiding roll 10, which serves as a counting roll, and is directed towards the winding roll 3. The abrasion ribbon 4 lies with its surface side facing away from the surface 202 of the test specimen 201 on the first guiding roll 9 and with its surface side facing the surface 202 of the test specimen 201 on the second guiding roll 10.

The dancing bar 11 can be moved between a lower position and an upper position. The upper position is shown by dashed lines in FIG. 4. To move the dancing bar 11 from the lower position to the upper position or from the upper position to the lower position, the dancing bar 11 is pivoted about its axis of rotation (T2) by means of the dancing bar holder 12. In the lower position, the axis of rotation (T1) of the dancing bar 11 lies in a first horizontal plane and a first vertical plane. In the upper position, the axis of rotation (T1) of the dancing bar 11 lies in a second horizontal plane, which is spaced apart from the first horizontal plane and located above it, and in a second vertical plane, which is spaced apart from the first vertical plane. The distance between the axis of rotation (T1) of the dancing bar 11 and the axis of rotation (T2) of the dancing bar holder 12 remains unchanged during the pivoting.

The testing device 1 can have an adjustment device (not shown) for adjusting the tensioning force that the dancing bar 11 exerts on the abrasion ribbon 4. By means of the adjustment device, a tensioning force is pre-adjusted that is intended to keep the dancing bar in its lower position. The tensioning force is applied to the dancing bar holder 12 via the adjustment device.

The testing device according to the invention comprises a detection device (not shown) for detecting the position of the dancing bar 11. If it is determined by means of the detection device that the dancing bar 11 does not reach the lower position for any reason, the testing of the surface 202 of the test specimen 201 may be stopped, as otherwise a false test would be carried out and/or no further abrasion ribbon 4 can be unwound from the feed roll 2, which means the end of the abrasion ribbon 4 is reached. The detection device is a position sensor that detects the position of the dancing bar 11 and transmits it to a control device.

Figure 5A:
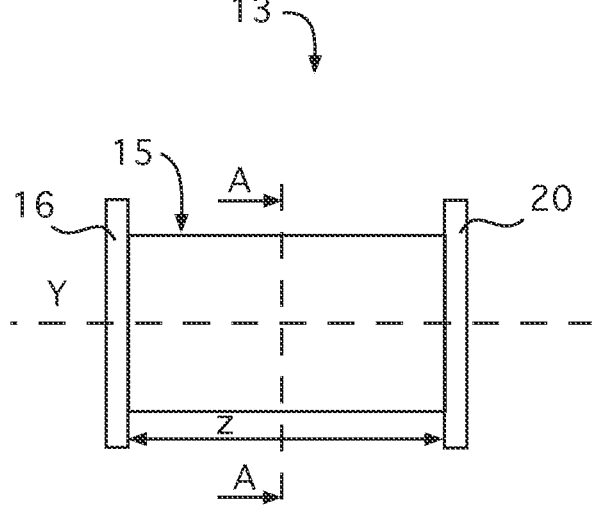
FIG. 5A a top view of a roll.
Figure 5B:
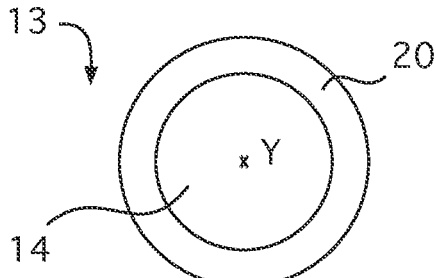
FIG. 5B a sectional view of the roll shown in FIG. 5A, cut along sectional line A-A of FIG. 5A.

In FIGS. 5A and 5B, a roll 13 is shown, which can be a guide roll, and feed roll, a winding roll, and a dancing bar. The roll 13 has a shaft 14 with an axis of rotation Y and a shell 15. The roll 13 also has two guiding elements 20, which are spaced apart from each other by a distance z, relative to the axis of rotation Y. The distance z is adapted to the width of the abrasion ribbon 4, so that movement of the abrasion ribbon axially to the axis of rotation Y of the shaft is prevented. The distance z between the two guiding elements 20 can be varied, for example by moving one or both guiding elements 20 on the shaft 14 or by changing the length of the shaft 14.

Figure 6:
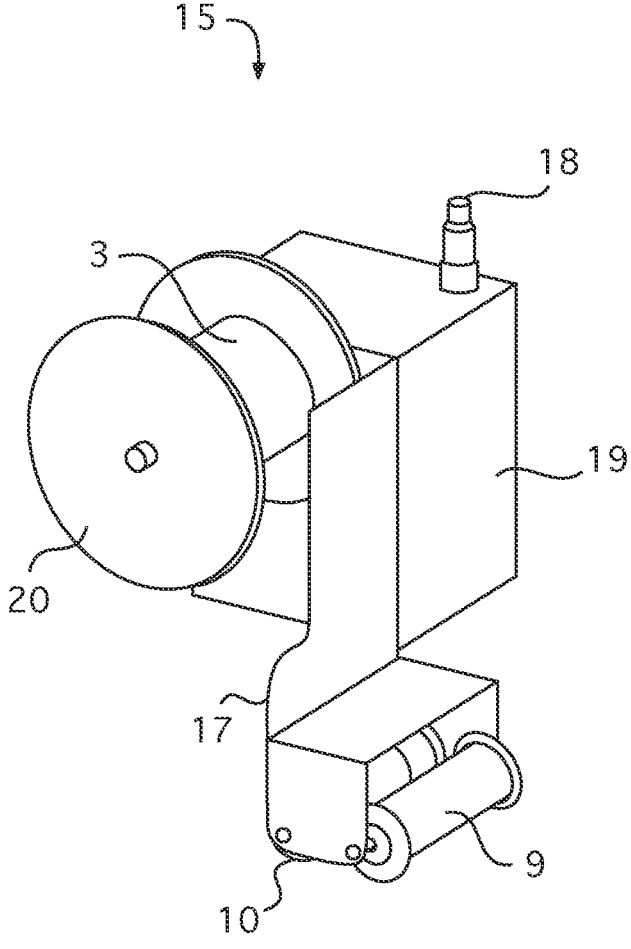
FIG. 6 a perspective illustration of a module for winding up the abrasion ribbon.

FIG. 6 shows a module 16 in which the winding roll 3, the first guide roll 9, and the second guide roll are attached to a frame 17. The winding roll 3, the first guide roll 9, and the second guide roll correspond to the second design of the testing device 1 shown in FIG. 3 and are needed for winding the abrasion ribbon 4 after leaving the testing area 5. The module 16 may also include a motor for rotating the winding roll 3 and at least one device for measuring the length of the abrasion ribbon 4, which are arranged in a housing 19 attached to the frame 17. The housing 19 is also part of the module 16.

The module 16 can be used to retrofit existing testing devices. For power supply of module 16 and data exchange between electronic components of module 16 with a control device, module 16 has a connection 18.

REFERENCE LIST

1 Testing device
2 Feed roll
3 Winding roll
4 Abrasion ribbon
5 Testing area
6 Load body
7 Gap
8 Drive unit
9 First guide roll
10 Second guide roll
11 Dancing bar
12 Dancing bar holder
13 Roll
14 Shaft
15 Shell 16 Module
17 Frame
18 Connection
19 Housing
20 Guiding element
21 Cylinder
22 Piston
23 Supply line
24 Test medium
25 Control device
101 Test device
102 Load body
103 Drive unit
104 Abrasion ribbon
105 Test medium
106 Supply line
107 Weight
201 Test sample
202 Test surface
301 Finger

The invention claimed is:

1. A testing device for testing a surface of a specimen using an abrasion ribbon and a load body, comprising:
the abrasion ribbon, the load body, a supply device, a testing area, a winding device, and a control device for controlling the testing device,
wherein the abrasion ribbon is guided in sections from the supply device through the testing area, where the abrasion ribbon can be brought into contact with the surface of the test specimen under the influence of the load body, to the winding device,
wherein the winding device has a drive for moving the abrasion ribbon using the winding device,
wherein the abrasion ribbon is brought into contact with the surface of the specimen only if transport of the abrasion ribbon from the supply device to the winding device is interrupted, and
wherein the abrasion ribbon is not in contact with the surface of the specimen during transport of the abrasion ribbon from the supply device to the winding device.

2. The testing device according to claim 1, wherein the drive rotates the winding device while winding or unwinding the abrasion ribbon.

3. The testing device according to claim 1, further comprising a means for determining the feed length of the abrasion ribbon.

4. The testing device according to claim 1, further comprising one or more guide rolls arranged between the testing area and the winding device.

5. The testing device according to claim 1, further comprising a dancing bar which is movable between an upper position and a lower position.

6. The testing device according to claim 5, further comprising an adjustment device for adjusting the tensioning force exerted by the dancing bar on the abrasion ribbon, wherein a preset tensioning force is set using the adjustment device to keep the dancing bar in its lower position.

7. The testing device according to claim 5, further comprising a sensing device for detecting the position of the dancing bar.

8. The testing device according to claim 7, wherein the sensing device is a sensor or a switch.

9. The testing device according to claim 5, wherein the dancing bar is a rotating dancing bar which is rotatably mounted on a dancing bar holder about an axis of rotation.

10. The testing device according to claim 9, wherein the dancing bar holder is rotatably mounted about an axis of rotation which is parallel to the axis of rotation of the dancing bar and spaced apart from it.

11. The testing device according to claim 5, wherein the dancing bar is located in a first vertical plane in its lower position and in a second vertical plane in its upper position, which is spaced apart from the first vertical plane.

12. The testing device according to claim 5, wherein the dancing bar or at least one of the guide rolls is a counting roll.

13. The testing device according to claim 5, wherein the dancing bar has lateral guide elements that prevent movement of the abrasion ribbon in the axial direction, relative to the axis of rotation of the dancing bar.

14. A method for testing a surface of a specimen using the testing device according to claim 11, comprising guiding the abrasion ribbon in sections from the supply device through the testing area in which the abrasion ribbon comes into contact with the test surface of the specimen under the influence of the load body onto the abrasion ribbon, to the winding device, whereby the abrasion ribbon is movable by means of the drive that drives the winding device.

15. The method according to claim 14, wherein the tension of the abrasion ribbon is changed by rotating the winding device.

* * * * *